US011256269B2

(12) United States Patent
Mallik et al.

(10) Patent No.: US 11,256,269 B2
(45) Date of Patent: Feb. 22, 2022

(54) OPTIMIZATION OF TASK COMPLETION IN A FACILITY

(71) Applicant: Robert Bosch GmbH, Stuttgart (DE)

(72) Inventors: Abhirup Mallik, San Jose, CA (US);
Marc Naumann, Sunnyvale, CA (US);
Arman Jabbari, Oakland, CA (US)

(73) Assignee: Robert Bosch GmbH, Stuttgart (DE)

( * ) Notice: Subject to any disclaimer, the term of this patent is extended or adjusted under 35 U.S.C. 154(b) by 139 days.

(21) Appl. No.: 16/204,826

(22) Filed: Nov. 29, 2018

(65) Prior Publication Data

US 2020/0174495 A1 Jun. 4, 2020

(51) Int. Cl.
*G05D 1/02* (2020.01)
*G05D 1/00* (2006.01)
*H04W 4/40* (2018.01)

(52) U.S. Cl.
CPC ......... *G05D 1/0291* (2013.01); *G05D 1/0088* (2013.01); *G05D 2201/0216* (2013.01); *H04W 4/40* (2018.02)

(58) Field of Classification Search
CPC ........ G06Q 50/30; G06Q 10/04; G06Q 50/28; G06Q 50/04; G06Q 10/20; G06Q 10/06; G05D 1/0088; G05D 1/0291; G05D 2201/0216; H04W 4/40; G05B 19/41865; G05B 19/41885; G05B 2219/33286; G05B 2219/40113
USPC .......................... 701/23; 705/26.3, 333, 334
See application file for complete search history.

(56) References Cited

U.S. PATENT DOCUMENTS

| | | | |
|---|---|---|---|
| 6,564,113 B1 | 5/2003 | Barto et al. | |
| 7,072,731 B1 | 7/2006 | Barto et al. | |
| 8,205,558 B2 | 6/2012 | Horn et al. | |
| 8,712,818 B2 | 4/2014 | Giles et al. | |
| 9,452,500 B2 | 9/2016 | Reid et al. | |
| 9,460,410 B2* | 10/2016 | Hill .................... | G06Q 10/083 |
| 9,729,639 B2 | 8/2017 | Sustaeta et al. | |
| 2004/0030428 A1* | 2/2004 | Crampton ............ | G06Q 10/087 |
| | | | 700/101 |
| 2008/0027591 A1* | 1/2008 | Lenser ................ | G05D 1/0251 |
| | | | 701/2 |
| 2010/0274611 A1 | 10/2010 | Kaufman et al. | |
| 2013/0124088 A1* | 5/2013 | Bruce .................. | G01C 21/203 |
| | | | 701/527 |
| 2015/0154532 A1* | 6/2015 | Skaaksrud .......... | G05D 1/0088 |
| | | | 705/341 |
| 2017/0011340 A1* | 1/2017 | Gabbai ............... | G06Q 10/0836 |
| 2017/0199518 A1 | 7/2017 | Stoeckel et al. | |
| 2019/0174514 A1* | 6/2019 | Ramesh ............... | H04W 4/021 |

* cited by examiner

*Primary Examiner* — Igor N Borissov
(74) *Attorney, Agent, or Firm* — David Kovacek; Maginot, Moore & Beck LLP

(57) ABSTRACT

A system and computer-implemented method for optimizing operations of a facility having a number of associated vehicles providing point-to-point transportation of deliverables. The vehicles may comprise autonomous operations directed by a processor. The deliverables may comprise materials or components for facility operations. The facility may be able to dynamically adapt to changes in environment or operational demands.

14 Claims, 3 Drawing Sheets

OPTIMIZATION OF TASK COMPLETION IN A FACILITY

TECHNICAL FIELD

This disclosure relates to an optimized delivery of materials to workstations within a manufacturing facility or other facility having industrial application such as a warehouse, storage facility, trucking depot, or other industrial center utilizing distinct workstations.

BACKGROUND

During a manufacturing process, in-facility transportation of materials is required to facilitate proper assembly of complex products. Raw materials or crafted parts are required at workstations within a facility during manufacture to properly assemble the finished product. Materials may be transported to various workstations using in-facility vehicles delivering raw materials or crafted parts to workstations that require them (sometimes referred to as "milkruns"). In-facility transportation may utilize a static set of conditions with fixed schedules for transportation vehicles. Transportation vehicles may utilize routes that are inefficient, or do not accommodate dynamic changes in conditions. Transportation vehicles may also suffer inefficiencies when accommodating the schedule requirements of human operators.

SUMMARY

One aspect of this disclosure is directed to a system for controlling a fleet of vehicles associated with a facility. The system may comprise a non-transitory computer-readable medium comprising instructions that when executed by a processor cause the processor to perform functions related to control of the vehicles. The functions of the controlling the vehicles may be related to completing a number of tasks by deploying the vehicles. The tasks may comprise point-to-point transportation requests for materials pertaining to the functions of the facility. The tasks may be completed according to a hierarchy of optimization factors used to guide the control of the vehicles toward an optimized solution for completion of the tasks.

Another aspect of this disclosure is directed to a facility operations management system comprising a processor in data communication with a memory, a transmitter, and a receiver. The transmitter and receiver may be operable to establish data communication between the processor and a number of vehicles associated with the facility. The processor may be operable to control the vehicles according instructions stored in the memory. The instructions may pertain to the goal of completing a number of tasks enabling the operations of the facility. The processor may be operable to control the vehicles for the purposes of coupling or decoupling to one or more trailers associated with the facility, the trailers utilized for point-to-point transportation of materials enabling operations of the facility.

A further aspect of this disclosure is directed to optimization of tasks for facility operations utilizing autonomous vehicles. Optimization may be accomplished based upon a hierarchy or combination of optimization factors developed utilizing a minimal number of variable expressions. Variable expressions may be minimized utilizing variable dependencies upon other known variables, such as time. Optimization may further be carried out according to a minimized infeasibility score indicating the possibility of completion of a particular task with respect to the available number of vehicles and their associated capabilities.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
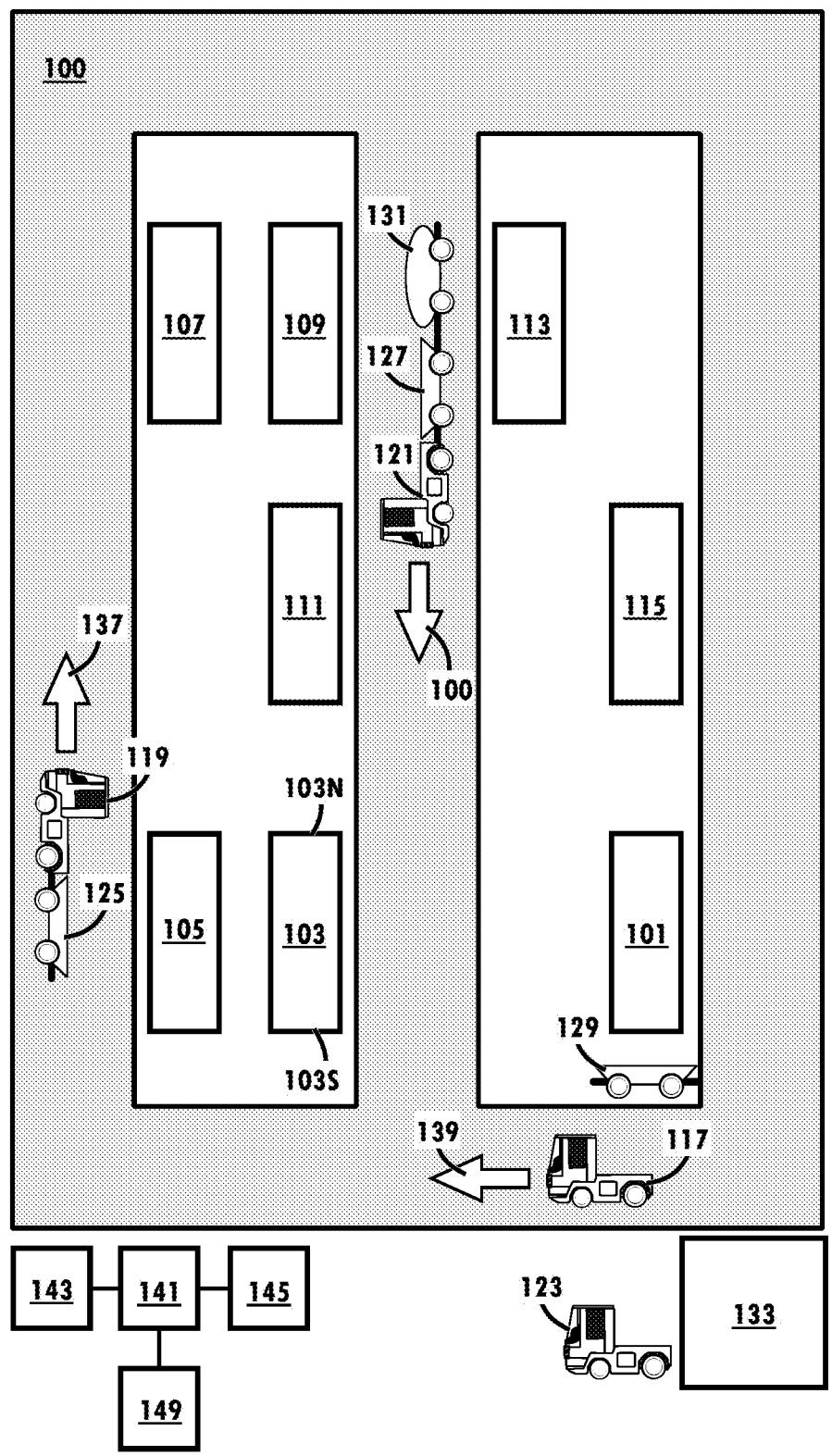
FIG. 1 is a diagrammatic illustration of a facility utilizing a system for point-to-point material transportation.

FIG. 1 is a diagrammatic illustration of an operational facility having a fleet of associated vehicles during operation according to an optimization. In the depicted embodiment, the facility may comprise a manufacturing plant, but other embodiments may comprise a facility suitable for material processing, packaging, chemical processing, shipping, or any other optimizable operation utilizing specialized facility operations without deviating from the teachings disclosed herein.

The operational facility comprises a pathway 100 and number of workstations and a number of associated vehicles within the facility. The depicted embodiment comprises workstations 101, 103, 105, 107, 109, 111, 113, and 115, each performing a function for operation of the facility. In the depicted embodiment, workstations 101-115 may each perform unique functions, but other embodiments may comprise two or more workstations performing substantially the same functions without deviating from the teachings disclosed herein. In the depicted embodiment, each of workstations 101-115 may comprise fully autonomous functional behaviors, but other embodiments may comprise workstations requiring user intervention without deviating from the teachings disclosed herein. In some embodiments, all of the workstations within the facility may require user intervention without deviating from the teachings disclosed herein. Optimization of the operations of the facility may utilize data indicating the placement, function, accessibility, and operating requirements of each workstation. By way of example and not limitation, workstation 101 may require a minimum quantity of raw material to produce components for assembly at workstation 103. Other embodiments may comprise other configurations such as a different number of workstations, a different arrangement of workstations, or a different layout of the facility without deviating from the teachings disclosed herein.

The facility may further comprise a fleet of vehicles. In the depicted embodiment, a fleet of vehicles may comprise vehicles 117, 119, 121, and 123, but other embodiments may comprise a different number of vehicles without deviating from the teachings disclosed herein. Vehicles 117-123 may be operable to complete a number of tasks comprising point-to-point transportation of deliverables from a source location within the facility to a destination location within the facility. Source locations and destination locations may be defined by the tasks associated with each point-to-point transportation. Deliverables may comprise materials, components, parts, chemicals, or any other supply utilized by a workstation within the facility in order to perform the function of the associated workstation. In some embodiments, deliverables may include operational supplies such as lubricants, coolants, replacement parts, or other materials or components utilized by the workstation that would not be included within the final manufactured output of the workstation. In some embodiments, workstations may comprise output systems for transporting deliverables between the workstations without the aid of the vehicles without deviating from the teachings disclosed herein. In such embodiments, output systems may comprise conveyors, rails, lifts, vacuum tubes, or other delivery systems known to one of ordinary skill in the art suitable for transport of deliverables between workstations. The teachings herein are directed primarily to the optimization of vehicle-based point-to-point transportation, and any such output systems are not shown in detail.

The vehicles may transport deliverables using one or more trailers associated with the facility. In the depicted embodiment, the facility comprises trailers 125, 127, 129, and 131, but other embodiments may comprise other configurations having a different number of trailers. Each trailer may be capable of transporting different types of deliverables. In the depicted embodiment, trailer 131 may be compatible with liquid deliverables, while trailers 135-129 may be compatible with solid deliverables. Trailers may be compatible with a plurality of types of deliverables, which may advantageously improve efficiency by permitting re-use of a single trailer for multiple deliverables during completion of tasks. Some trailers may be configured to support multiple types of materials simultaneously without deviating from the teachings disclosed therein. A trailer's compatibility with a particular deliverable may be defined by the specification of the trailer (e.g., trailer volume, weight capacity), specified requirements for the deliverable (e.g., statutory safety requirements, active refrigeration measures), a compatible transfer mechanism for the destination workstation, or any other compatibility definition recognized by one of ordinary skill in the art without deviating from the teachings disclosed herein.

The functional capabilities of vehicles 117-123 may be distinct for each vehicle, but in some embodiments one or more of the vehicles associated with the facility may comprise the same functional capability. Functional capabilities may comprise performance metrics such as maximum safe moving speed, maximum hauling capacity, maximum hauling volume, or maneuverability specifications. In some embodiments, vehicles may have a maximum trailer capacity indicating the maximum number of trailers they can tow. Some performance metrics may be context-specific. By way of example and not limitation, a vehicle may be less maneuverable and incapable of maximum speeds while towing a large train of trailers compared to when unencumbered by any trailers. Functional capability may comprise functional compatibility, such as trailer compatibility, a coupling mechanism, or a transfer mechanism. Other functional capabilities may be considered with respect to a vehicle without deviating from the teachings disclosed herein.

In the depicted embodiment, vehicles 117-123 may be deployed from a depot 133. Depot 133 may provide a location within the facility to house vehicles 117-123 when they are not currently being deployed. Depot 133 may provide a location for loading a vehicle with an initial haul of deliverables before being deployed to complete a task. In the depicted embodiment, depot 133 comprises a position off the pathway 100 upon which vehicles traverse to arrive at workstations, but other embodiments may comprise other configurations without deviating from the teachings disclosed herein. Some embodiments may not comprise a depot without deviating from the teachings disclosed herein.

Each schedule of tasks may comprise a number of tasks detailing point-to-point transportation requirements for facility operation. Each task within a schedule of tasks may comprise information necessary for optimized completion of the associated task. Tasks may comprise a starting location, a destination location, an associated deliverable, an associated trailer type, a priority for an associated task, a deadline for completion, or an earliest time for pickup. The schedule of tasks may be considered complete once the deployed vehicle successfully completes each task in the schedule. Tasks may require a vehicle to attach a trailer, detach a trailer, load deliverables or unload deliverables at a workstation or at depot 133.

FIG. 1 depicts the facility during an optimized operation. In the depicted embodiment, vehicles 117-123 are actively deployed according to an optimized schedule of tasks for completion. Vehicle 117 may be traversing pathway 100 in a direction 135 after initial deployment from depot 133. Vehicle 119 may be traversing pathway 100 in a direction 137 to deliver the contents of trailer 125 to a destination point defined by its current task. Vehicle 121 may be traversing pathway 100 in a direction 139 to deliver the contents of trailers 127 and 131 to one or more destination points defined by its current task. In the depicted embodiment, vehicle 123 is not currently deployed, and remains near depot 133. In the depicted embodiment, each vehicle may be assigned a number of tasks to perform consecutively after leaving depot 133, and may return to depot 133 after the completion of the assigned tasks to await further deployment. For example, vehicle 121 may be delivering the contents of trailer 131 to workstation 103 as a first task before delivering the contents of trailer 127 to workstation 115, after which it will return to depot 133. In the depicted embodiment, vehicles 117-123 are fully autonomous, but in some embodiments one or more of the vehicles in the facility require human operation without deviating from the teachings disclosed therein.

Some tasks may require a vehicle to couple to a trailer positioned somewhere in the facility other than depot 133. In the depicted embodiment, trailer 129 is located near workstation 101 and is available to be coupled to a vehicle that is deployed from depot 133.

The deployment of the vehicles to complete the tasks may be directed by a processor 141. Processor 141 may control the deployment by establishing wireless data communication with each of the vehicles. Processor 141 may be embodied as a mobile processing device, a smartphone, a tablet computer, a laptop computer, a wearable computing device, a desktop computer, a personal digital assistant (PDA) device, a handheld processor device, a specialized processor device, a system of processors distributed across a network, a system of processors configured in wired or wireless communication, or any other alternative embodiment known to one of ordinary skill in the art.

Wireless data communication may be accomplished utilizing a transmitter 143 and receiver 145. Each of vehicles 117-123 may comprise a transceiver operable to permit data communication with the transmitter 143 and receiver 145.

Some embodiments may comprise a single transceiver operable to perform the functions of both transmitter 143 and receiver 145 without deviating from the teachings disclosed herein. Processor 141 may be configured to communicate wirelessly via one or more of an RF (radio frequency) specification, cellular phone channels (analog or digital), cellular data channels, a Bluetooth specification, a Wi-Fi specification, a satellite transceiver specification, infrared transmission, a Zigbee specification, Local Area Network (LAN), Wireless Local Area Network (WLAN), RFID, or any other alternative configuration, protocol, or standard known to one of ordinary skill in the art.

Processor 141 may further be in data communication with a memory 147. Memory 147 may comprise a data store operable to store data pertinent to the operations of the facility. Memory 147 may further comprise instructions that when read by processor 141 cause processor 141 to perform the operations of controlling the optimized deployment of the vehicles or other associated functions of facility operation. Memory 147 may be embodied as a non-transitory computer-readable storage medium or a machine-readable medium for carrying or having computer-executable instructions or data structures stored thereon. Such non-transitory computer-readable storage media or machine-readable medium may be any available media embodied in a hardware or physical form that can be accessed by a general purpose or special purpose computer. By way of example, and not limitation, such non-transitory computer-readable storage media or machine-readable medium may comprise random-access memory (RAM), read-only memory (ROM), electrically erasable programmable read-only memory (EEPROM), optical disc storage, magnetic disk storage, linear magnetic data storage, magnetic storage devices, flash memory, or any other medium which can be used to carry or store desired program code means in the form of computer-executable instructions or data structures. Combinations of the above should also be included within the scope of the non-transitory computer-readable storage media or machine-readable medium.

Processor 141 may be in data communication with a user interface 149 operable to permit a user to enter data and commands to control the functions of the processor, or to access data stored in memory 147. In the depicted embodiment, a user may use the user interface 149 to enter tasks, task schedules, change information pertaining to optimization, or directly command one or more of the vehicles associated with the facility.

Processor 141 may be operable to optimize the deployment of vehicles to complete the schedule of tasks according to a hierarchy or combination of optimization factors. Optimization factors may comprise constraints of the facility operation, such as vehicle capabilities or trailer compatibility, as well as constraints placed upon the tasks for successful completion, such as a deadline for task completion, or a minimum output for the facility. Additional optimization factors may include time to completion of all tasks in a schedule of tasks, and an infeasibility score for completion of the tasks. Other constraints may include time constraints caused by human workers within the facility, such as scheduled breaks, shift changes, or availability of operators of the facility.

Infeasibility score may be understood as an indication of whether it is possible to successfully complete the schedule of tasks with the given constraints. Infeasibility score provides a mechanism to compare different potential optimizations using a simple value comparison. Optimizations that have a minimum infeasibility score are considered to be the most feasible optimizations for the schedule of tasks. The best optimization solution is the one that minimizes the task lateness for each task, and thus minimizes the total time of the sequence of tasks in a task schedule. An infeasibility score of zero indicates that the optimization will be successful given the constraints of the schedule of tasks given the current conditions of the facility, but a higher infeasibility score may indicate that the schedule of tasks may only be successfully completed given a different set of constraints.

Each optimization will utilize a number of variables to model the schedule of tasks. Minimizing the number of variables to track advantageously reduces the complexity of optimization, and may result in a successful optimized solution for schedules having a greater number of tasks. In the depicted embodiment, complexity may be successfully reduced by defining some variables as variable expressions with respect to other variables. For example, one useful variable to serve as a basis for variable expressions is a sequence of tasks for each vehicle. Other variables, such as the distance a vehicle must travel for a particular task, can instead be defined as a variable expression expressed as the amount of time required to traverse the distance. In another example, the maximum capacity of a trailer may be expressed as a variable expression dependent upon the task sequence. By defining as many possible variable expressions with respect to another variable, such as the task sequence, the solution time may be minimized. In some embodiments, defining all variables except for task sequence as variable expressions can result in functional optimization of a large number of tasks for a particular task schedule. A schedule of 80 tasks may be completed, but in some embodiments an arbitrary number of tasks, such as greater than 200 tasks, may be similarly accomplished.

Processor 141 finds efficient solutions by testing different solutions using mathematical optimization techniques and may select the solution which minimizes the results with respect to a particular variable. By maximizing the utilization of variable expressions, the complexity of optimization may be kept at manageable levels.

As an example, in FIG. 1 vehicles 117-123 may be unable to perform U-turn maneuvers on pathway 100. Maneuvering to a succession of workstations that require changes of direction may be modeled by the amount of time required to traverse pathway 100 between workstations without performing U-turn maneuvers. In some embodiments, other maneuverability limitations may be considered without deviating from the teachings disclosed herein. In some embodiments, vehicles 117-123 may each comprise different maneuverability limitations without deviating from the teachings disclosed herein. In the depicted embodiment, if vehicle 117 is to travel to workstation 105, then workstation 111, and then workstation 109, the optimization must consider the time to traverse another route along pathway 100 because a U-turn is not permissible. Some complexity of this constraint may be further reduced by defining starting locations and destination locations as distinct opposite ends of workstations, trailers, depot 133, or other landmarks not depicted in this embodiment. For example, solutions may consider that a vehicle can arrive at the "North" end 103N or the "South" end 103S of workstation 111. In the disclosure herein "North" and "South" are used as indicators of distinct ends of a workstation as depicted in FIG. 1, but other embodiments may utilize other identifies such as "left" and "right", "first" and "second", "A" and "B", or any other distinct identifier without deviating from the teachings disclosed herein. Defining each end of a location may inform the optimization process how to minimize time for traversal for a better solution requiring less total time. In the depicted embodiment, for example, vehicle 117 may travel to workstation 103 by way of South end 103S faster than if it must approach from the North end 103N. In this manner, a "best path" can be determined for a vehicle depending upon which destination locations must be reached for task completion. Consideration of the "North" and "South" ends of each workstation may be utilized during calculation of a best path for each vehicle before deployment to complete a schedule of tasks. In the depicted embodiment, the best path may be calculated in its entirety prior to deployment, but other embodiments may calculate a best path between locations upon arrival at a particular location. During optimization, the order of tasks within the schedule of tasks may be adjusted to accommodate a best path depending on consideration of "North" and "South" ends of each workstation.

Other factors may be considered in optimization, such as the availability of vehicles to complete different tasks. For example, a single task may be most efficiently completed by utilizing the entirety of the fleet of vehicles to address the task, but the schedule of tasks may have a better optimized solution if different vehicles are utilized to address other tasks simultaneously. By way of example and not limitation, if vehicles 117 and 119 are three times as fast as vehicle 121, but each have 25% the capacity of vehicle 121, it may be more efficient to utilize vehicles 117 and 119 for multiple trips to a particular destination workstation rather than single trip using only vehicle 121. However, this solution may not be the best optimized solution if the destination workstation can only accommodate unloading from a single vehicle at a time and requires a particularly long time to properly unload the deliverables from each vehicle. In the depicted embodiment, an, optimization may be found first by minimizing the infeasibility score of the schedule of tasks, then minimizing the lateness of each task, and lastly minimizing the total time for completion using a minimized complexity model to find a best schedule for completion of all the tasks.

Figure 2:
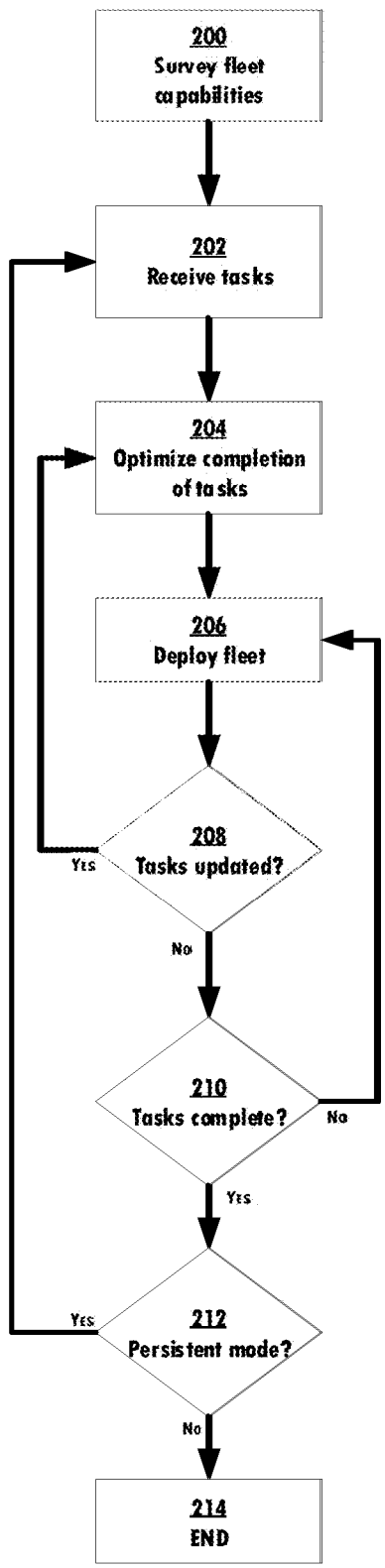
FIG. 2 is a flowchart illustrating a method of optimizing point-to-point material transportation within a facility.

FIG. 2 is an illustration of a generalized method for completing a schedule of tasks within a facility. Before the operations can begin, the method must first survey the conditions of the facility and the fleet at step 200. The survey of the facility and fleet informs the method of capabilities of vehicles, capabilities of trailers, availability of any human workers, and the configuration and layout of the facility. This step effectively defines constraints to optimization based upon the facility, workers, and the fleet of vehicles. In the depicted embodiment, step 200 may be automatically performed using a processor-based implementation.

After the survey is complete, the method proceeds to step 202, where the schedule of tasks is received. The schedule of tasks comprises a number of tasks with associated information for each task that may be utilized to find an optimized solution according to a hierarchy or combination of optimization factors. The hierarchy of optimization factors may advantageously be defined using a number of variable expressions defined in relation to a minimized number of variables. Minimizing the number of variables considered by the hierarchy of optimization factors may lower the complexity of the optimization for the schedule of tasks.

The optimization of tasks is then calculated in step 204, and the fleet of vehicles is deployed according to the optimized solution in step 206. While the fleet is deployed, the method checks to see if the schedule of tasks or constraints have been updated at step 208. If the schedule of tasks or other data have been updated during deployment, the method may dynamically adapt to the updated schedule be returning to step 204 to find a new optimized solution for completing the tasks based on the new schedule and/or constraints and the current location and status of vehicles, their trailer configuration and associated tasks. If no updates have been made the deployment continues and the method proceeds to step 210 to determine if the schedule of tasks has been completed. If more tasks remain in the schedule of tasks, the method returns to step 206 to deploy the fleet of vehicles again to address remaining tasks. Otherwise, if the tasks have been completed, the method may satisfy conditions to end the method. In the depicted embodiment, the method proceeds to step 212 to determine if operation should persist even if all tasks have been completed. If the method remains in a persistent mode, the method returns to step 202 and waits for additional tasks to be received. By way of example, and not limitation, step 212 may be suitable when performing the method during a shift of work if the tasks are completed before the work shift is over. Some embodiments may not comprise step 212 without deviating from the teachings disclosed herein.

In some embodiments, a termination condition may be included in the considerations of step 210 that end the method even if the schedule of tasks remains incomplete. Termination conditions may comprise such conditions as the end of all work shifts in the facility, a stoppage required by failure of a workstation, a lack of an appropriate vehicle to transport a necessary deliverable, or any other termination condition recognized by one of ordinary skill in the art without deviating from the teachings disclosed herein. In some embodiments, termination conditions may not exist and the schedule of tasks may be updated during deployment indefinitely, resulting in a method that runs continuously without deviating from the teachings disclosed herein.

In embodiments wherein step 210 comprises a termination condition, the method may restart at step 200 after receiving a starting condition indicating the need to start the method again. In some embodiments, the method may restart at step 202 or return to step 206 for redeployment of the fleet according to the conditions known at the time of termination. Other embodiments may comprise any of these alternatives of the method without deviating from the teachings disclosed herein.

Figure 3A:
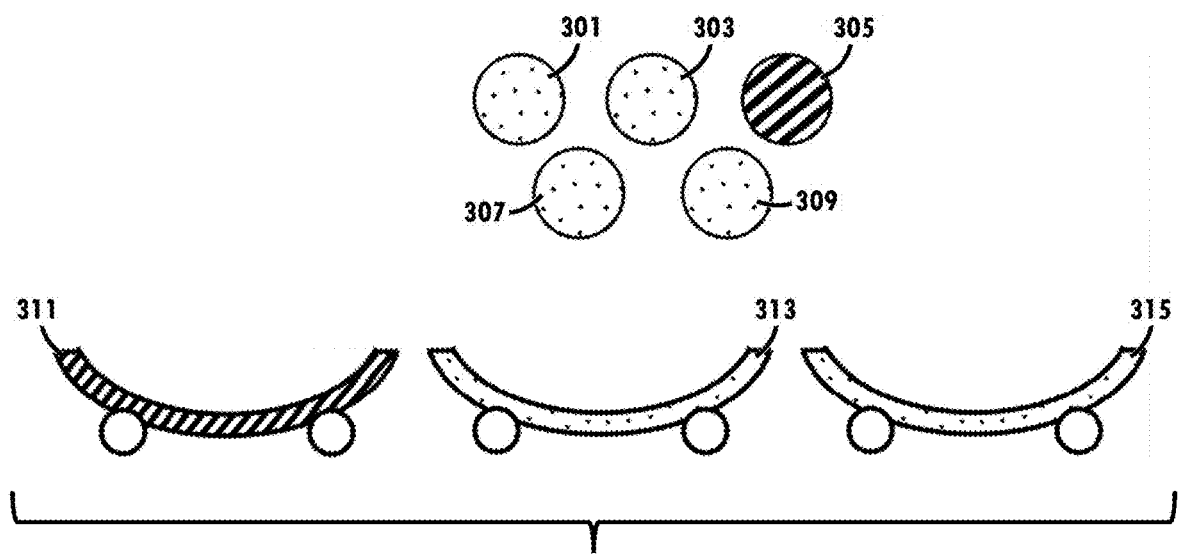
FIG. 3a is a diagrammatic illustration of an optimization of material transportation according to a hierarchy of factors.
Figure 3B:
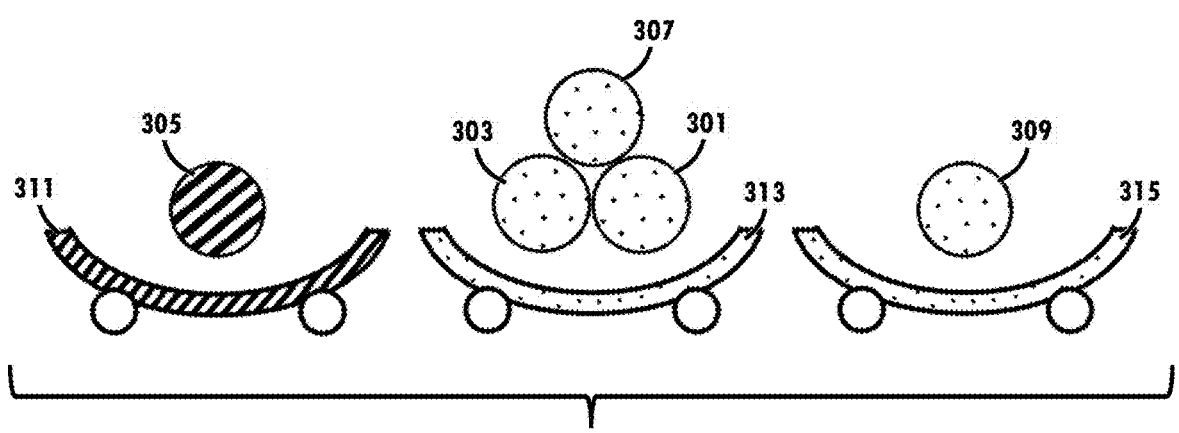
FIG. 3b is a diagrammatic illustration of an optimization of material transportation according to a hierarchy of factors.

FIG. 3*a* and FIG. 3*b* are diagrammatic illustrations of a trailer selection algorithm that may be used to optimize a deployment of vehicles in facility, such as the deployment depicted in FIG. 1. FIG. 3*a* represents a starting condition of the solution, having a number of deliverables 301, 303, 305, 307, and 309, and a number of trailers 311, 313, and 315. Not all of trailers 311-315 are compatible with all of deliverables 301-309. For the purposes of this example, each of trailers 311-315 may have a maximum capacity of 3 deliverables.

In the depicted embodiment, the hierarchy or combination of optimization factors may prioritize the trailers based upon the time each trailer is expected to uncouple from the vehicle during a point-to-point transportation task. In the depicted embodiment, trailer 311 is scheduled to uncouple first because its associated deliverables will be delivered first. The next deliverables to be delivered are associated with trailer 313 or trailer 315. For these reasons, the priority of loading the trailers may indicate that trailer 311 has the highest loading priority, followed by trailer 313, and finally trailer 315.

In the depicted embodiment, the hierarchy or combination of optimization factors may prioritize the deliverables according to the order they are received at a depot for loading (they are usually also picked up somewhere else). In some embodiments, deliverables may be loaded at locations within the facility other than the depot without deviating from the teachings disclosed herein, and the selection algorithm may be performed again at these other locations using the current load of a vehicle as a starting condition. In the depicted embodiment, the deliverables are prioritized in order, from highest loading priority to lowest loading priority, of deliverable 301 deliverable 303, deliverable 305, deliverable 307, and deliverable 309.

In the depicted embodiment, deliverable 301 is considered for loading. Deliverable 301 is not compatible with trailer 311, and thus instead is loaded onto trailer 313. Deliverable 303 is similarly not compatible with trailer 311 and is instead loaded onto trailer 313. Deliverable 305 is compatible with trailer 311 and is loaded onto trailer 311 accordingly. Deliverable 307 is not compatible with trailer 311, and is instead loaded onto trailer 313. Deliverable 309 is not compatible with trailer 311, and cannot be loaded onto trailer 313 because trailer 313 is already at maximum capacity. Thus, deliverable 309 is instead loaded onto the next compatible trailer 315, resulting in the depicted embodiment of FIG. 3b.

If the available trailers cannot adequately address a particular deliverable, the infeasibility score for the current conditions may be increased by one to reflect a suboptimal solution. Other solutions may utilize different configurations of trailers available within the facility to achieve lower infeasibility scores. A minimum infeasibility score may be preferred when finding a best optimized solution. In some embodiments, a solution is only considered valid if the infeasibility score is zero.

While exemplary embodiments are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:

1. A non-transitory computer-readable medium comprising instructions that when executed by a processor associated with a facility having a fleet of autonomous vehicles, cause the processor to perform the steps of:
    receiving capabilities for each autonomous vehicle of the fleet, the capabilities comprising a moving velocity, a list of valid maneuvers, a list of task compatibility, and a maximum weight capacity;
    receiving a number of tasks, each task to be completed by at least one of the autonomous vehicles, each task comprising a point-to-point transportation request and an associated completion deadline for the point-to-point transportation, each point-to-point transportation request defining a starting point and an ending point within the facility, the starting point and ending point each comprising a distinct identifier showing an endpoint associated with a direction of travel; and
    deploying the fleet of autonomous vehicles to complete the number of tasks according to a hierarchy of optimization factors, each of the optimization factors defining a constraint for optimization of a deployment of the fleet of autonomous vehicles within the facility, the deployment utilizing the hierarchy of optimization factors to deploy each vehicle according to its respective capabilities,
    wherein the number of tasks is updated during the deploying of the fleet of autonomous vehicles,
    wherein the hierarchy of optimization factors are defined using a minimized number of variable expressions, the number of variable expressions only utilizing variables that cannot be defined using other variables, including a task sequence,
    wherein one of the number of variable expressions comprises an infeasibility score indicating the possibility of successfully completing the number of tasks according to the hierarchy of optimization factors,
    wherein one of the number of variable expressions comprises a lateness value for each task, and
    wherein the hierarchy of optimization factors prioritizes the infeasibility score over the lateness value for each task.

2. The computer-readable medium of claim 1, wherein each task further comprises an earliest completion time for the point-to-point transportation.

3. The computer-readable medium of claim 1, wherein the capabilities for each autonomous vehicle further comprise a trailer compatibility indicating the associated vehicle's compatibility with a number of trailers configured to couple to a vehicle and a maximum trailer capacity indicating the associated vehicle's upper limit of coupled trailers.

4. The computer-readable medium of claim 1, wherein the hierarchy of optimization factors is updated during the deploying of the fleet of autonomous vehicles, and wherein the deploying of the fleet of autonomous vehicles is adjusted according to the hierarchy of optimization factors in response to each update of the hierarchy of optimization.

5. The computer-readable medium of claim 1, wherein each task of the schedule of tasks further comprises a task priority indicating a rating of importance for the task to be completed.

6. The computer-readable medium of claim 1, wherein the deploying the fleet of autonomous vehicles is performed iteratively in response to the schedule of tasks and the hierarchy of optimization factors until a termination condition is satisfied.

7. The computer-readable medium of claim 6, wherein the termination condition comprises the completion of each task comprising the schedule of tasks.

8. The computer-readable medium of claim 6, wherein the termination condition comprises a power-down command provided by a user of the facility.

9. The computer-readable medium of claim 8, wherein any autonomous vehicles actively engaging in a deployment to complete the schedule of tasks during reception of a power-down command complete the current deployment.

10. The computer-readable medium of claim 1, wherein deploying an autonomous vehicle comprises beginning deployment from an initialization position within the facility and returning the autonomous vehicle to the initialization position after completion of assigned tasks.

11. A facility operations management system comprising:
    a processor;
    a memory in data communication with the processor;
    a transmitter in data communication with the processor, the transmitter operable to transmit data to a number of autonomous vehicles associated with the facility; and
    a receiver in data communication with the processor, the receiver operable to receive data from the number of autonomous vehicles,
    wherein the processor is operable to receive a number of tasks and control the number of autonomous vehicles to complete the number of tasks according to a hierarchy of optimization factors and the capabilities of each of the number of autonomous vehicles, each of the number of tasks comprising a point-to-point transportation request and an associated completion deadline, each point-to-point transportation request defining a starting point and an ending point within the facility, the starting point and ending point each comprising a distinct identifier showing an endpoint associated with a direction of travel, wherein the processor is operable to define the hierarchy of optimization factors using a minimized number of variable expressions, the number of variable expressions only utilizing variables that cannot be defined using other variables, including a task sequence, wherein one of the number of variable expressions comprises an infeasibility score indicating the possibility of successfully completing the number of tasks according to the hierarchy of optimization factors, wherein one of the number of variable expressions comprises a lateness value for each task, and wherein the hierarchy of optimization factors prioritizes the infeasibility score over the lateness value for each task.

12. The system of claim 11, further comprising a user interface in data communication with the processor, the user interface operable to receive commands adjusting the hierarchy of optimization factors and the number of tasks.

13. The system of claim 11, wherein control of the number of autonomous vehicles comprises a number of trailer commands operable to instruct the autonomous vehicles to couple and decouple from a number of trailers associated with the facility.

14. The system of claim 13, wherein the processor is further operable to assign at least one of the autonomous vehicles to each task based upon an infeasibility score, the infeasibility score based upon the compatibility and availability of each of the autonomous vehicles and the compatibility and availability of each of the number of trailers with respect to a current task.

* * * * *